United States Patent
Cavallo

(10) Patent No.: US 8,278,912 B2
(45) Date of Patent: Oct. 2, 2012

(54) TWIST-GRIP CONTROL DEVICE HAVING MEANS FOR DETECTING ABNORMAL OPERATION

(75) Inventor: Emanuele Cavallo, Savona (IT)

(73) Assignee: Bitron S.p.A., Turin (IT)

( * ) Notice: Subject to any disclaimer, the term of this patent is extended or adjusted under 35 U.S.C. 154(b) by 486 days.

(21) Appl. No.: 12/374,250

(22) PCT Filed: Jul. 17, 2007

(86) PCT No.: PCT/IB2007/052846
§ 371 (c)(1),
(2), (4) Date: Apr. 8, 2009

(87) PCT Pub. No.: WO2008/010186
PCT Pub. Date: Jan. 24, 2008

(65) Prior Publication Data
US 2009/0201014 A1    Aug. 13, 2009

(30) Foreign Application Priority Data
Jul. 19, 2006 (IT) ............... TO2006A0526

(51) Int. Cl.
*G01B 7/30* (2006.01)
(52) U.S. Cl. ................ 324/207.2; 324/207.25
(58) Field of Classification Search ............ 324/207.25
See application file for complete search history.

(56) References Cited

U.S. PATENT DOCUMENTS

| | | | |
|---|---|---|---|
| 6,276,230 B1* | 8/2001 | Crum et al. | 74/551.9 |
| 7,174,093 B2* | 2/2007 | Kidd et al. | 388/811 |
| 7,414,392 B2* | 8/2008 | Parenti | 324/207.2 |
| 2002/0135330 A1* | 9/2002 | Birkestrand et al. | 318/139 |
| 2002/0152821 A1* | 10/2002 | Strothmann | 73/862.332 |
| 2002/0179825 A1* | 12/2002 | Lin et al. | 250/231.14 |
| 2003/0080732 A1* | 5/2003 | Okazaki et al. | 324/207.2 |
| 2005/0127903 A1 | 6/2005 | Sogge | |
| 2005/0225319 A1* | 10/2005 | Bailey et al. | 324/207.12 |
| 2005/0238337 A1* | 10/2005 | Kidd et al. | 388/838 |

FOREIGN PATENT DOCUMENTS

| | | |
|---|---|---|
| DE | 102006057732 A1 | 7/2007 |
| EP | 1464571 A2 | 10/2004 |
| EP | 1553277 A1 | 7/2005 |
| EP | 1647808 A1 | 4/2006 |
| WO | 2005/042306 A2 | 5/2005 |

* cited by examiner

*Primary Examiner* — Jay Patidar
(74) *Attorney, Agent, or Firm* — Sughrue Mion, PLLC

(57) ABSTRACT

A twist-grip control device that produces a pair of electrical signals indicative of the relative angular position of the rotor portion. These signals are correlated with one another such that one of the signals may be used as a control signal indicative of the extent of an associated controlled physical magnitude desired by the user, and the other signal may be used as a control signal adapted to enable the detection of the occurrence of operating malfunctions or failures when these signals are no longer correlated with one another in the predetermined relationship.

5 Claims, 5 Drawing Sheets

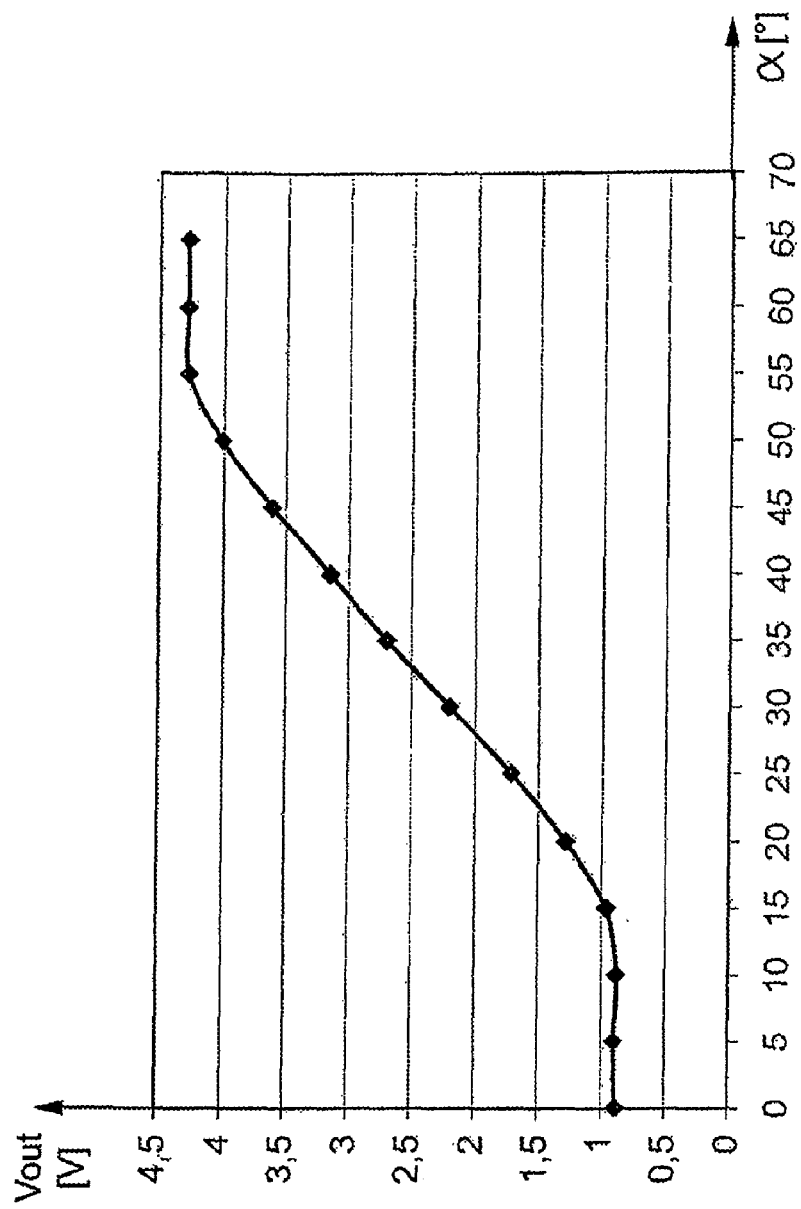

TWIST-GRIP CONTROL DEVICE HAVING MEANS FOR DETECTING ABNORMAL OPERATION

The present invention relates to a twist-grip control device adapted to enable a user to set a desired value of a physical magnitude or controlled parameter.

The invention relates more particularly to a twist-grip control device which may be used in particular as an accelerator for motor vehicles and the like (motorcycles, scooters, mopeds, aquatic craft and other vehicles, with two or more wheels, provided with handlebars, etc.), but may also be used in other contexts, for instance in video games or as an interface for virtual reality applications.

An object of the present invention is to provide a twist-grip control device of an improved type which is highly reliable in operation.

These and other objects are achieved by the invention by means of a twist-grip control device comprising:

- a stator portion which is stationary in operation,
- a rotor portion which is adapted to be gripped and which is mounted such as to be manually rotatable about an axis with respect to the stator portion, against the action of resilient opposing means tending to recall the rotor portion into a relative angular rest position,
- first and second permanent magnet means connected to the rotor portion in respective separate angular fields about said axis and adapted to generate respective predetermined angular distributions of magnetic field intensity about said axis, and
- first and second magnetic field sensors connected to the stator portion in respective separate angular positions about said axis, and associated with the first and second permanent magnets respectively in order to provide, when the rotor portion is rotated by a certain angle with respect to the stator portion, a respective first and second electrical signal indicating the relative angular position of the rotor portion with respect to the stator portion; the first and second signals being correlated with one another in a predetermined relationship such that one of the signals is adapted to be used as a control signal indicative of the extent of an associated controlled physical magnitude desired by the user, and the other signal is adapted to be used as a control signal adapted to enable detection of the occurrence of operating malfunctions or failures when these signals are no longer correlated with one another in the predetermined relationship.

Other features and advantages of the invention will become clear from the following detailed description which is given with reference to the accompanying drawings which are provided purely by way of non-limiting example and in which:

FIG. 6 is a diagram showing, in qualitative terms, the curve of the control signal generated by a twist-grip control device of the invention as a function of the angular position of its rotor portion.

Figure 1:
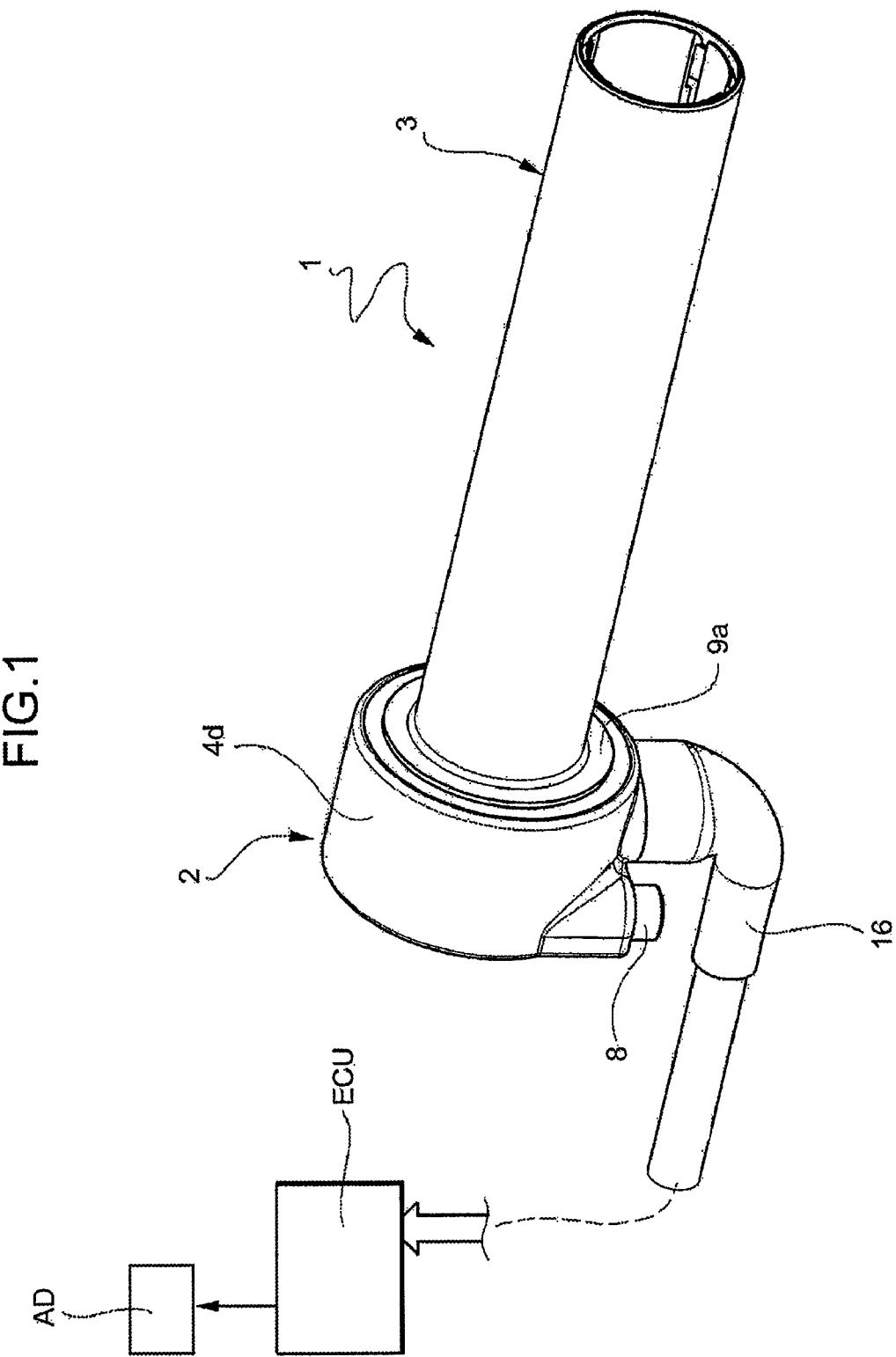
FIG. 1 is a perspective view of a twist-grip control device of the present invention.
Figure 2:
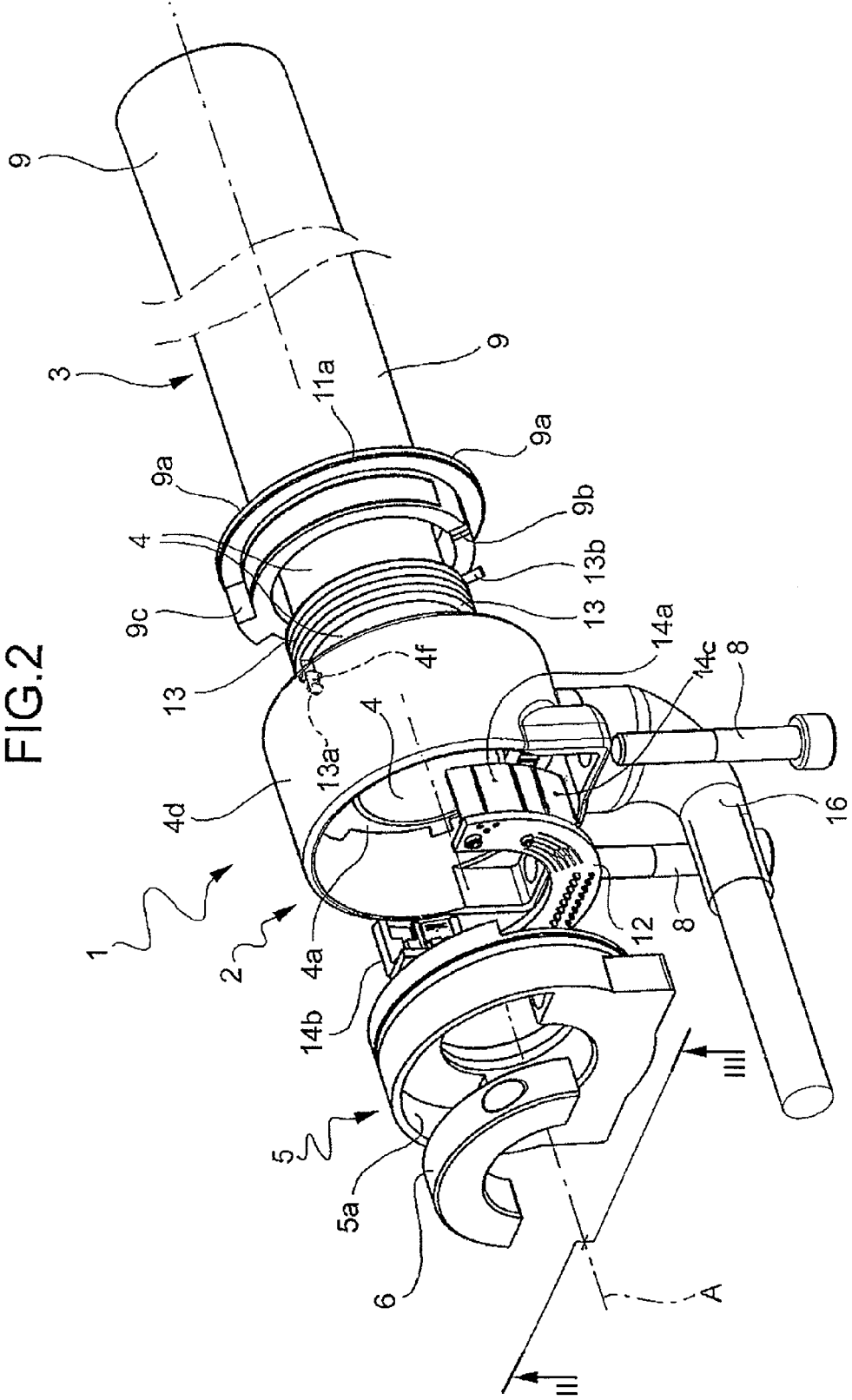
FIG. 2 is an exploded perspective view of the twist-grip control device of FIG. 1.
Figure 3:
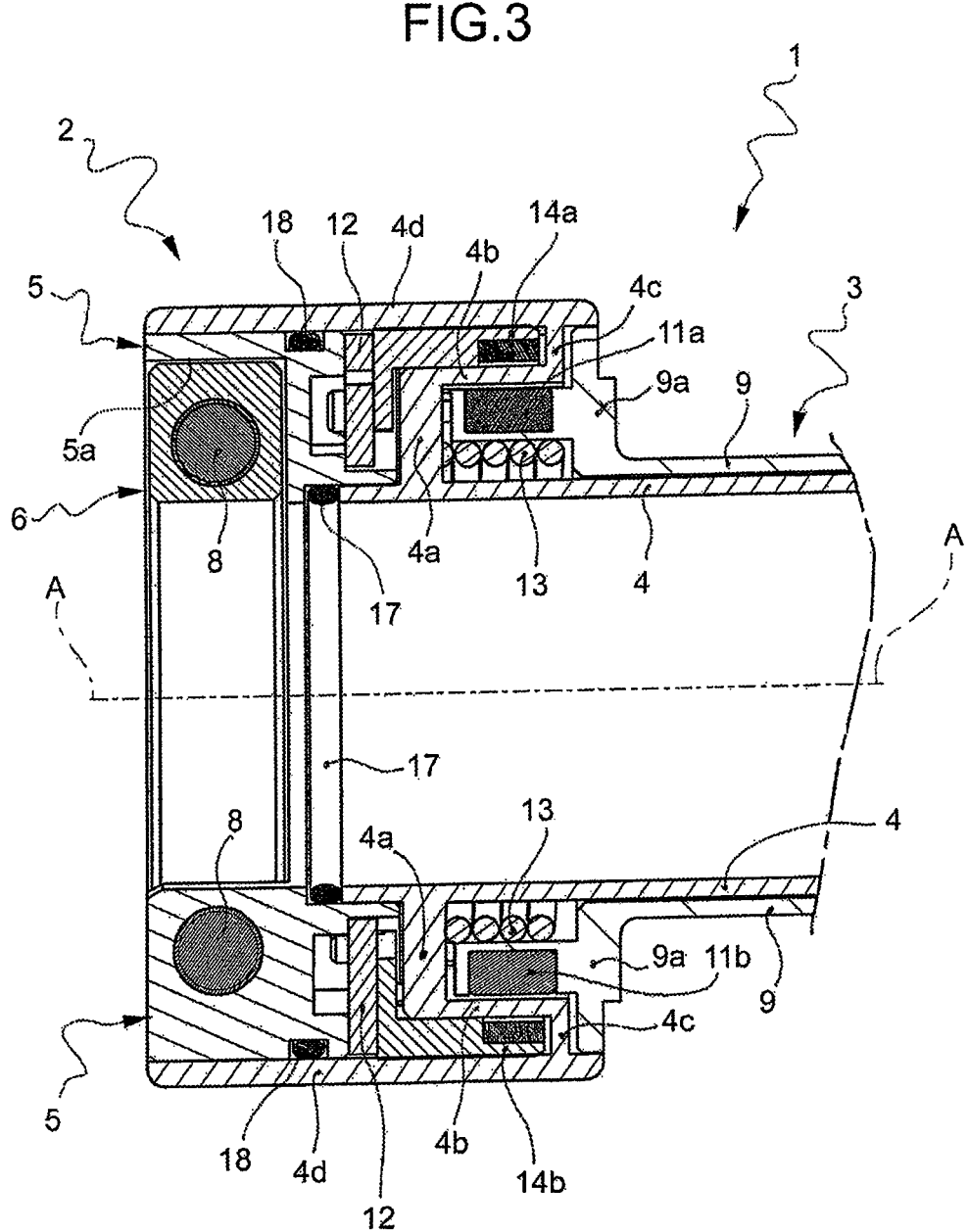
FIG. 3 is a partial view, on an enlarged scale, in cross-section along the line III-III of FIG. 2.

In FIGS. 1 to 3, a twist-grip control device of the present invention is shown overall by 1.

The device 1 substantially comprises a stator portion 2, which is stationary in operation, and a rotor portion 3 which may be gripped.

With reference to FIGS. 2 and 3 in particular, the stator portion 2 comprises a stationary tubular member 4 adapted to be secured to a bearing member such as the handlebar of a motor vehicle. One end of the tubular member 4 comprises a flange 4a (FIGS. 2 and 3) which is connected to an outer tubular jacket 4d by means of a tubular portion 4b and a further flange 4c.

The stator portion 2 further comprises a positioning and fastening ring 5 which extends facing the flange 4a and within the outer jacket 4d of the stationary tubular member 4 and a clamping half-ring 6 disposed in a hollow seat 5a of a shape corresponding to the ring 5.

Advantageously, with reference to FIGS. 2 and 3, the ring 5 and the half-ring 6 are stably secured to the jacket 4d of the tubular member 4 by means of a pair of screws 8 engaged in corresponding openings provided in these members.

The rotor portion 3 of the twist-grip control device 1 substantially comprises a rotary tubular member 9 which may be gripped. The end of this member 9 which faces the stator portion 2 forms an end flange 9a which extends into a corresponding seat 4e formed between the flange 4a and the tubular portion 4b of the stationary tubular member 4 (FIG. 3).

The flange 9a is connected, for instance by duplicate moulding, to two curved permanent magnets 11a and 11b. These permanent magnets are substantially shaped as segments of a ring, with an angular extension of less than 180°, for instance of approximately 120°.

Figure 4:
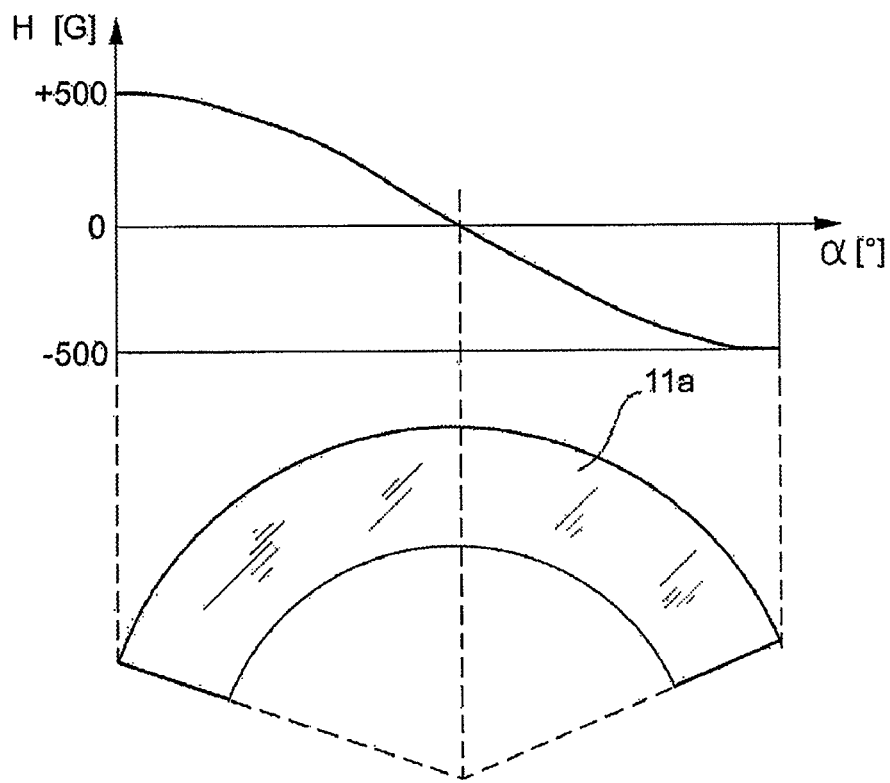
FIG. 4 illustrates, in qualitative terms, the angular distribution of the magnetic field intensity generated by a permanent magnet included in a twist-grip control device of the invention.

FIG. 4 shows the permanent magnet 11a. This figure also shows, in qualitative terms, its magnetization curve, i.e. the intensity H of the magnetic field generated thereby. This magnetic field has a maximum intensity in absolute terms at its extremes which is equal, for instance, to 500 G (Gauss), and a substantially zero value corresponding to the median section of the magnet.

As will be explained in detail below, the two magnets 11a and 11b may have the same magnetization characteristic or a different magnetization characteristic.

With reference to FIGS. 2 and 3, the stator portion 2 further comprises a plate 12, shaped as a segment of a ring, secured between the flange 9a of the tubular member 4 and the ring 5.

The tubular gripper member 9 is mounted to rotate about the stationary tubular member 4 of the stator portion 2.

The whole rotor portion 3 may be manually rotated about the axis A-A common to the stationary tubular member 4 and the rotary tubular gripper member 9 (FIG. 3).

A helical spring 13 operating by torsion is interposed between the stator portion 2 and the rotor portion 3.

In the embodiment shown, the spring 13 has two ends or prongs 13a and 13b (FIG. 2) engaged in an opening 4f of the stationary tubular member 4 and in a notch 9b of the rotary tubular member 9 respectively.

The arrangement is such that the spring 13 tends to maintain the rotor portion 3 in a relative angular rest position (FIG. 1) and to oppose the angular displacement of this rotor portion with respect to the stator portion.

In FIG. 2, at least one radial longitudinal projection 9c extends from the end flange 9a of the rotary tubular member 9 and is adapted to cooperate with corresponding spaced angular shoulders provided in the outer jacket 4d of the stationary member 4 in order to define the angular end-of-stroke positions for the rotor portion 3.

Figure 5:
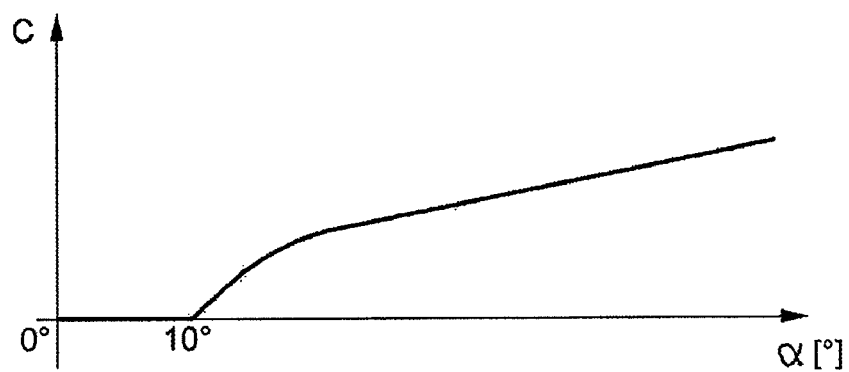
FIG. 5 is a diagram showing, in qualitative terms, the curve of the resistant torque of a twist-grip control device of the invention as the angular position thereof varies.

If one of the ends or prongs 13a or 13b of the spring 13 is engaged in an opening 4f or 9b having a certain angular extension about the axis A-A, it is possible for the rotor portion 3 to have a so-called rest play, i.e. an initial angular stroke which is substantially free before the resistance opposed by the spring is encountered. This solution makes it possible to simulate the so-called free play of traditional twist-grip accelerators for motor vehicles. In other words, it is possible to provide a twist-grip control device with a torque (C)/angular displacement ($\alpha$) characteristic for instance of the type shown in qualitative terms in FIG. 5, i.e. with a substantially free initial stroke (for instance of approximately 10°), i.e. with no appreciable resistance to rotation.

With reference to FIGS. 2 and 3, respective magnetic field sensors 14a, 14b, for instance Hall effect sensors, are secured to the plate 12 in diametrically opposite positions. Each of these sensors is adapted to work in association with a corresponding permanent magnet 11a, 11b in order to provide as output a voltage signal $V_{out}$ which, as a function of the relative angular position of the rotor portion 3 with respect to the stator portion 2, may have a curve of the type shown by way of example in FIG. 6.

The characteristic $V_{out}(\alpha)$ shown in FIG. 6 advantageously has two extremes (beginning and end of stroke) in which, as the relative angular position $\alpha$ varies, the output voltage $V_{out}$ remains substantially at respective constant levels (clamp values).

In operation, the two sensors 14a and 14b both supply a signal which is indicative of the relative angular position of the rotor portion 3 with respect to the stator portion 2.

Advantageously, the signals supplied by the two sensors are correlated with one another in a predetermined relationship. Therefore, for instance, if the magnets 11a and 11b are identical and the two sensors 14a, 14b are identical and identically located in relation to the magnets, the signals supplied in operation by the two sensors will be equal.

As an alternative, the arrangement may be such that the relationship between the two signals which may be obtained with the two sensors is not identical: the signal supplied at each instant by one sensor could for instance have an amplitude double that of the signal supplied by the other sensor. This could be obtained, for instance, by using two permanent magnets having a different magnetization or by using integrated sensors having a different internal signal gain.

According to a further alternative, the magnets 11a and 11b are preferably identical and the sensors 14a and 14b are of programmable type and preferably also identical. In this case, the desired relationship between the signals supplied by two sensors may be obtained by programming them differently (in terms of the amplitude of the output signal as a function of the angular position). This solution is also advantageous as it makes it possible readily to enable the device to operate according to different methods, for instance on an angular field of 60° which is typical of mopeds, or on a angular field of 85° which is typical for scooters, without having to modify the mechanics of the device.

With reference to FIG. 1, the two sensors are connected in use to an external electronic processing unit ECU adapted to acquire and analyse the signals supplied by these sensors and accordingly to drive associated actuator devices AD, such as fuel injector devices of the engine of a motor vehicle.

The connection between the twist-grip control device 1 and the unit ECU may be provided by cabling emerging from the device via a pipe formation 16 or by cabling coupled in a detachable manner to an electrical connector integrated in the device.

The processing unit ECU is in particular adapted to use the signal supplied by one sensor as a control signal indicative of the extent of an associated controlled physical magnitude desired by the user, and to use the signal supplied by the other sensor as a control signal adapted to enable the detection of the occurrence of operating malfunctions or failures when the two signals are no longer correlated with one another in the predetermined relationship. In practice, it may be the case, for instance as a result of a strong magnetic field external to the device, that the predetermined relationship between the two signals is not satisfied and in such cases the unit ECU is able to detect the occurrence of an abnormal operating condition and to take any safety measures.

As a result, the twist-grip control device of the present invention behaves in a very reliable and safe manner.

Advantageously, the device may comprise a further sensor or switch 14c or, preferably, a pair of further sensors or switches 14c also cooperating with the magnets 11a or 11b in order to generate, in operation, a further signal or pair of signals in order to provide further information as regards the engine idling speed zone. This further sensor, or this further pair of sensors, may advantageously also be of the programmable type. As an alternative, a proximity switch or a pair of proximity switches may also be used.

With reference to FIG. 3, two sealing O-rings are shown by 17 and 18, the first of which is interposed between the ring 5 and the adjacent end of the stationary tubular member 4, and the second of which is interposed between the periphery of the ring 5 and the inner surface of the jacket 4d of the tubular member 4. These rings 17 and 18 ensure efficient leak-tight sealing of the region in which the plate 12 extends with the sensors 14a and 14b and the circuits associated therewith. It will be appreciated that both these rings carry out a static sealing action, i.e. between relatively stationary parts.

Naturally, the principle of the invention remaining the same, the forms of embodiment and details of construction may be varied widely with respect to those described and illustrated, which have been given purely by way of example, without thereby departing from the scope of the invention as defined in the accompanying claims.

The invention claimed is:

1. A twist-grip control device (1), for motor vehicles, comprising
   a stator portion (2) which is stationary in operation,
   a rotor portion (3) which is configured to be gripped and which is mounted such as to be manually rotatable about an axis (A-A) with respect to the stator portion (2), against the action of resilient opposing means (13) tending to recall the rotor portion (3) into a relative angular rest position,
   first and second permanent magnet means (11a, 11b) connected to the rotor portion (3) in respective separate angular fields about said axis (A-A) and configured to generate respective predetermined angular distributions of magnetic field intensity about said axis (A-A),
   first and second magnetic field sensors (14a, 14b) connected to the stator portion (2) in respective separate angular positions about said axis (A-A), and associated with the first and second permanent magnet means (11a, 11b) respectively in order to provide, when the rotor portion (3) is rotated by a certain angle with respect to the stator portion (2), a respective first and second electrical signal indicating the relative angular position of the rotor portion (3), the first and second signals being correlated with one another in a predetermined relationship such that one of the signals is used as a control signal indicative of the extent of an associated controlled physical magnitude required by the user, and the other signal is used as a control signal to enable detection of the occurrence of operating malfunctions or failures when these signals are no longer correlated with one another in the predetermined relationship; and further comprising at least one further sensor means associated with the magnets (14a, 14b) to provide a further signal in respect of the angular position field of the rotor portion (3) corresponding to a range of operation at idling speed of the engine of the motor vehicle.

2. A twist-grip control device according to claim 1, wherein the rotor portion (3) and the stator portion (2) are coupled together by the resilient opposing means (13) such that the rotor portion (3) is configured to perform a substantially free predetermined initial stroke from the relative angular rest position.

3. A twist-grip control device according to claim 1 or 2, wherein the first and second magnetic field sensors (14a, 14b) are Hall effect sensors.

4. A twist-grip control device according to claim 1, wherein the sensors (14a, 14b) are of programmable type.

5. A twist-grip control device according to claim 1, wherein the resilient opposing means comprise a helical spring (13) operating by torsion.

* * * * *